Figure 1:
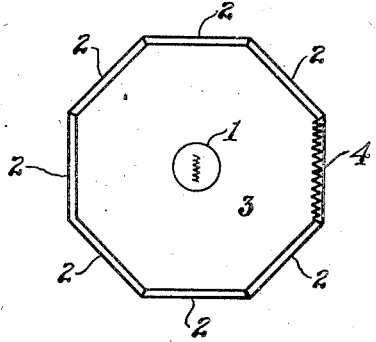

Dec. 3, 1929.  P. S. MILLAR  1,738,383
STREET ILLUMINATION
Filed July 3, 1926   2 Sheets-Sheet 1

INVENTOR
Preston S. Millar
BY
Frank L. Dyer
ATTORNEY

Dec. 3, 1929.  P. S. MILLAR  1,738,383
STREET ILLUMINATION
Filed July 3, 1926  2 Sheets-Sheet 2
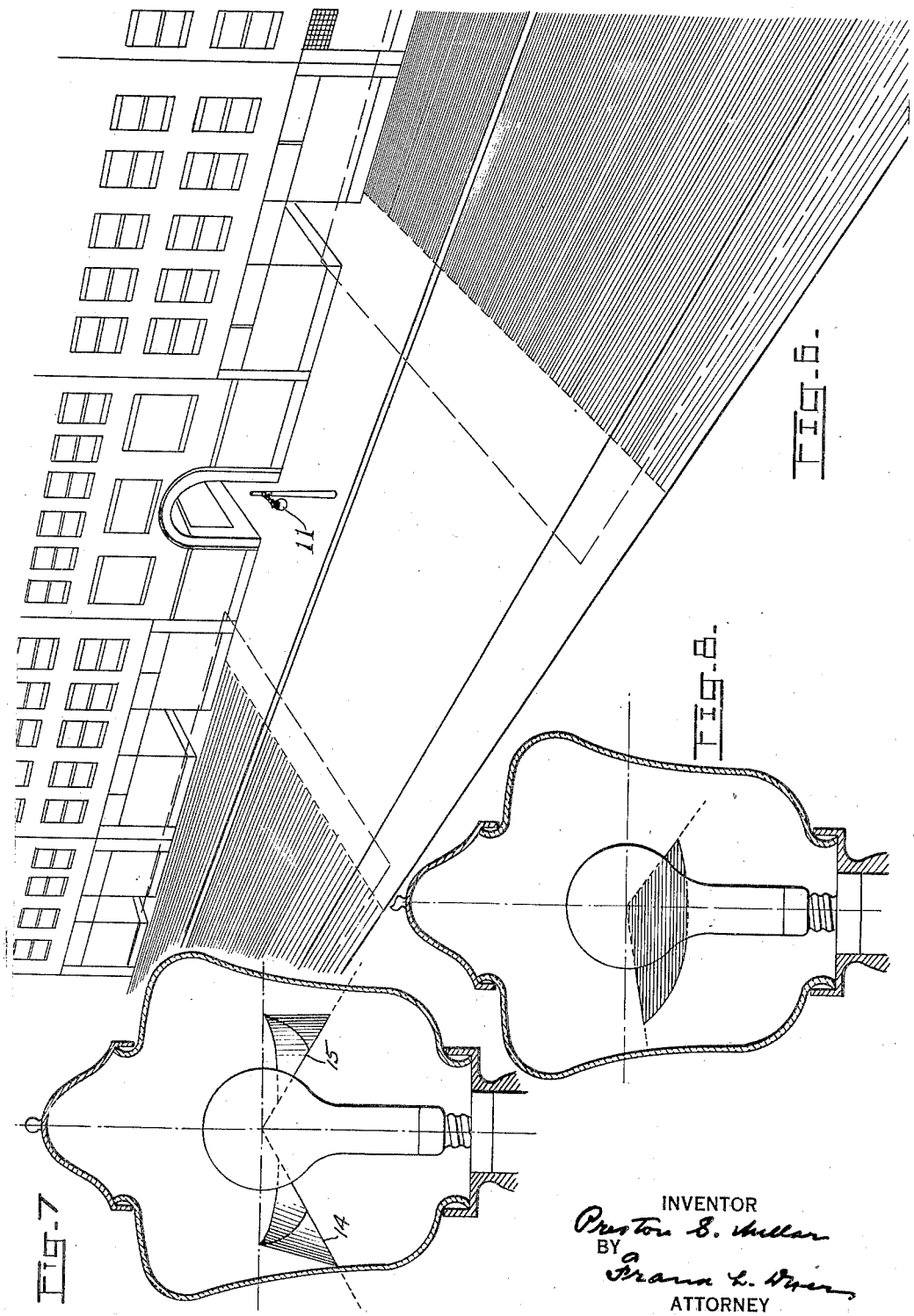
INVENTOR
Preston S. Millar
BY
Frank L. Dyer
ATTORNEY

UNITED STATES PATENT OFFICE

PRESTON S. MILLAR, OF BROOKLYN, NEW YORK

STREET ILLUMINATION

Application filed July 3, 1926. Serial No. 120,370.

This invention relates generally to the art of street illumination whereby superior results are secured. The illumination of city streets has been the subject of much investigation and experiment. The consensus of engineering opinion heretofore has agreed that in order to secure the most effective illumination, there shall be distributed a high intensity of light at such an angle as to increase the illumination of streets midway between lamps and thereby promote approach to uniformity of illumination of street surfaces.

By reason of general failure to appreciate how largely objects are seen on the street at night by silhouetting and how seriously detrimental glare is to visibility, street lighting units in which attempts have been made to distribute the light for test results have been generally unsuccessful for the reason that the distribution of the light for uniform illumination results in inferior silhouetting and enhanced glare.

Under the present invention visibility is not secured by striving for uniformity of incident illumination, but rather by diminishing the candlepower and brightness of the source in the direction of the eye to a point which represents the best compromise between glare and best vision and by increasing the total quantity of light delivered upon the street surface near the lamp and upon the areas paralleling the street and, where desired, upon adjacent building fronts.

In order to apply light more effectively to the illumination of streets, the source of light, its envelope, and any reflecting, refracting or otherwise redirecting auxiliaries (contrary to previous practice and belief,) must deliver in the direction of the eyes of users of the street, light of a candlepower not in excess of that which may be employed without undue glare and must present in the same direction a brightness correspondingly not in excess of the desirable maximum This purpose may be accomplished by structural changes in the illuminant itself or in the equipment with which it is employed. The latter may include interposition between source and observer of diffusing or refracting or other media; changing the shape, curvature or contour of the equipment employed with the illuminant or otherwise modifying illuminant or equipment to accomplish the desired purpose.

It may further be accomplished by delivering upon the surfaces of street, sidewalk and in some cases adjacent buildings, as much as possible of the light flux produced by the illuminant keeping all high candlepower, however, outside the region from which the lamp or luminaire is likely to be seen by the user of the street. Such lighting equipment will render bright all surfaces upon which there is dependence for good visibility conditions at night, but will avoid for the user of the street the high candlepower and excessive brightness offered by all modern methods of street lighting.

In order that the invention may be well understood I illustrate in Figures 1, 2, 3, 4 and 5 of the accompanying drawings, various forms of lamps or luminairs intended for use in lighting streets and embodying my present invention. Each of these views is a horizontal section taken through the body of the lamp substantially in the plane of the source of illumination. In each view the source is an incandescent lamp 1, although obviously other desired sources may be employed.

In Figure 6 the general nature of the illumination produced by my invention is depicted.

Figures 7 and 8 are illustrations in vertical section of luminairs embodying my invention.

In Figure 1 the luminairs consist of a paneled lantern having plain panels 2 for transmitting a relatively large flux of light downward and transversely of the street as well as on the sidewalks or adjacent buildings, the lantern being provided with a glass bottom panel to enhance the effect.

The panel 4 which is exposed to the longitudinal plane of the street, is formed with ribs or prisms as shown so that it will transmit relatively little light throughout the area of the street corresponding with the field of view of user thereof. At the same time the maximum illumination secured in all other directions will improve the silhouette effect and thus enhance visibility.

Figure 2:
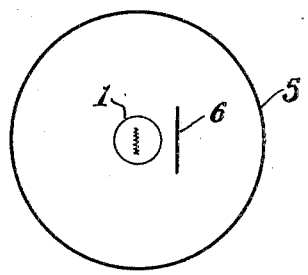

In Figure 2 the luminair is provided with a glass envelope 5, transparent or translucent throughout its sides and bottom, and a mirror 6 is employed to reduce the light in the direction of approach of pedestrians or vehicles. Instead of the mirror I may employ a wedge shaped deflector on one or both sides of the source of illumination, the function of which will be to deflect the light from the direction of the eyes of the user of the street to either side and downward. If such a translucent glass deflector is employed, it is preferably varied gradually from practical transparency at the sides or edges to relatively great density near the center whereby objectionable shadows on the enclosing glass envelope will be obviated.

Figure 3:
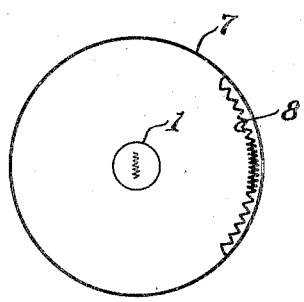

In Figure 3 the lamp is provided with the translucent or transparent envelope 7 and with the fluted panel 8 for cutting down the illumination longitudinally of the street.

Figure 4:
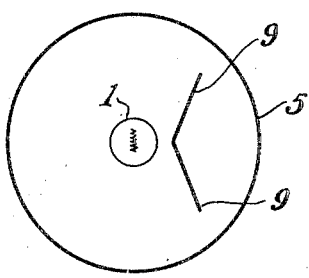
Figure 5:
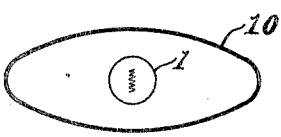

Figure 4 shows the same plain or translucent envelope 5 as in Figure 2 but an interposed mirror or deflector is employed in the form of two angularly arranged sections 9, 9. In Figure 5 the same effect is secured by changing the shape of the envelope 10 so that the maximum light flux will be distributed transversely of the street.

The nature of the street illumination produced by my invention is illustrated by Fig. 6 which depicts a section of a street and one luminair 11 located slightly back of the curb in the customary manner. As will be seen, the area directly below the luminair and the areas immediately adjacent the street are brightly illuminated, whereas the remainder of the street itself is illuminated to a less degree as indicated by the shading, that is to say, to a degree below that which will cause glare in the eyes of users of the street. The shaded portions lie of course, in the directions in which the light flux from the source is intercepted by the glare shields. It will be noted that these shaded portions are confined approximately to the roadway and sidewalks and that the illumination of all other areas is undiminished, in fact it may be increased by the reflection of the intercepted light flux from the shields.

This effect is accomplished by my invention, as illustrated in Figs. 1 to 4.

Fig. 7 also illustrates a luminair provided with glare shields for accomplishing this effect. In this instance I have shown two glare shields, one on each side of the source of light, for intercepting the light flux in both directions of the street. The shield numbered 13 is a portion of a conical surface, whereas shield 14 is a portion of a cylindrical surface. As a matter of fact, the shields may comprise portions of a conical, cylindrical, spherical, plane or other surface, just so long as it is limited in extent to intercept the direct light only in the desired solid angle while directing as much as practicable of the intercepted light in useful directions where it will not produce glare in the eyes of street users. The solid angle referred to is one bounded by three imaginary planes which intersect at the light source as follows:

The first plane is one which is inclined at an angle, say of 30° to the horizontal and which will contain a horizontal line passing through the source of light at right angles to the direction of the street. The second plane is one determined by a horizonal line passing through the light source parallel to the direction of the street and a second horizontal line parallel to the direction of the street and located at approximately the eye level, that is about five feet vertically above one edge of the street. The third plane is one which will include the above mentioned horizontal line passing through the light source parallel to the direction of the street and a second horizontal line parallel to the direction of the street and located at approximately the eye level vertically above the other edge of the street. The solid angle thus produced determines the dimensions of the glare shield to accomplish the desired results. A shield, whether cylindrical, conical or of any other general form will accomplish this, provided its contour is such as will approximately coincide with the cross section of this solid angle.

Obviously if the luminair is located upon one side of the street the glare shields will not be symmetrical, but will have a form similar to that shown in Fig. 8, which illustrates the same luminair as Fig. 7, viewed from a direction parallel to the street.

Shields formed in this manner and of a degree of translucency or transparency to reduce the light flux in the desired directions to the desired degree will be adapted to intercept direct light between the light source and users of the roadway or sidewalk at any distance up to a position in which the user of the street will be naturally protected against glare by hat brim, windshield, etc.

It will be understood that lamps or luminairs involving this invention are to be mounted at appropriate distances apart, being supported in any suitable and desired way. If a lamp or luminair is to be employed at the crossing of two streets, the shields will be so formed as to cut down the glare longitudinally of both streets.

It will be understood that the mirrors, deflectors or prisms herein referred to may be located either on one side of the source of illumination so as to protect pedestrians and occupants of vehicles from glare effects in approaching the light from one direction, or be located on opposite sides of the source.

Also it will be understood that the said mirrors, deflectors or prisms are of such form as to permit light rays to project beneath the same up to an angle at which rays will not be objectionable, since they will not reach the eyes of the observer.

Having now described the invention, what applicant claims as new therein and desires to secure by Letters Patent, is as follows:

A luminair for street illumination comprising a source of light and shielding means associated therewith for reducing the light flux to a non-glaring value in certain directions, said shielding means being so positioned with respect to the light source that it approximately coincides with a cross section of the solid angle formed by an imaginary plane containing a horizontal line which passes through the light source at right angles to the direction of the street and an inclined line passing through said light source in a vertical plane parallel to the direction of said street, a plane determined by a horizontal line passing through the light source, parallel to the direction of the street and a second horizontal line parallel to the direction of the street and located at approximately eye level and vertically above one edge of the street and a plane which includes the above mentioned horizontal line passing through the light source parallel to the direction of the street and a second horizontal line parallel to the direction of the street and located at approximately the eye level, vertically above the other edge of the street.

PRESTON S. MILLAR.